United States Patent [19]

Smith, III et al.

[11] Patent Number: 5,037,201

[45] Date of Patent: Aug. 6, 1991

[54] SPECTRAL RESOLVING AND SENSING APPARATUS

[75] Inventors: Zerol Smith, III; Robert F. Tow; Robert A. Street, all of Palo Alto, Calif.

[73] Assignee: Xerox Corporation, Stamford, Conn.

[21] Appl. No.: 502,473

[22] Filed: Mar. 30, 1990

[51] Int. Cl.⁵ .......................... G01J 3/14; G01J 3/18; G01J 3/36

[52] U.S. Cl. .................................. 356/326; 250/226; 356/328; 358/75; 359/572; 359/566; 359/615

[58] Field of Search ............... 356/300, 326, 328, 331, 356/334; 350/162.17, 162.22, 162.23, 168, 96.11, 96.19; 250/226; 358/75

[56] References Cited

U.S. PATENT DOCUMENTS

| | | | |
|---|---|---|---|
| 4,335,933 | 6/1982 | Palmer | 350/96.19 |
| 4,375,649 | 3/1983 | Mir et al. | 358/75 |
| 4,580,889 | 4/1986 | Hiranuma et al. | 355/4 |
| 4,709,114 | 11/1987 | Vincent | 250/226 |
| 4,734,760 | 3/1988 | Futaki | 358/75 |
| 4,746,934 | 5/1988 | Schoening | 346/110 |
| 4,748,680 | 5/1988 | Margolin | 382/65 |
| 4,784,935 | 11/1988 | Ehrfeld et al. | 356/328 |
| 4,786,964 | 11/1988 | Plummer et al. | 358/44 |
| 4,822,998 | 4/1989 | Yokota et al. | 250/226 |
| 4,838,645 | 6/1989 | Mächler et al. | 356/328 |
| 4,852,079 | 7/1989 | Kinney et al. | 356/328 |

FOREIGN PATENT DOCUMENTS 248006 11/1986 Japan ............................. 350/96.11
113707 5/1989 Japan ............................. 350/96.11

OTHER PUBLICATIONS

Pedrotti, F. L., and L. S. Pedrotti, Introduction to Optics, Prentice Hall, 1987, pp. 419–422.
Kogata Sensor Kaihatsu, Publisher and Date Unknown, Source–Inventor, pp. 37–40.
Wyszecki, Gunter and W. S. Stiles, Color Science, Second Ed., John Wiley & Sons, 1982, pp. 130–143.

Primary Examiner—F. L. Evans
Attorney, Agent, or Firm—Jonathan A. Small

[57] ABSTRACT

A compact, self contained image resolving and sensing apparatus of the type used in electronic imaging applications includes a plurality of sensing devices such as photodetectors formed on a transparent substrate capable of resolving a polychromatic image incident thereupon. The mechanism by which the substrate resolves the incident image may be refraction, diffraction or other suitable mechanism. The sensing devices are sized and located on the substrate such that they are capable of detecting one or more wavelength components of the resolved polychromatic image. Logic and select circuitry may be formed on the substrate generally contemporaneously and of similar materials as the sensing device.

30 Claims, 7 Drawing Sheets

SPECTRAL RESOLVING AND SENSING APPARATUS

BACKGROUND OF THE INVENTION

The present invention relates generally to sensing and detecting apparatus, and more specifically to compact, self-contained solid-state apparatus for resolving electromagnetic spectra such as separating light into constituent colors and detecting selected groups of colors, typically used in scanners, electronic cameras, detectors, and the like.

Spectrally resolving an electromagnetic signal, for example light, into its constituent wavelengths, for example colors, is well known. Typical apparatus for doing so include prisms, diffraction gratings, thin films, etc., and many applications have been made of the ability to spectrally resolve such signals into their constituent parts. Electronic imaging, filtering, and object recognition are several of the more common applications. Electronic imaging applications are of primary concern herein, including those that operate primarily in the visible light region of the electromagnetic spectrum, and those that operate primarily outside that region. (For purposes of the present application "spectral" shall be used to mean both visible and nonvisible regions of the electromagnetic spectrum.) Electronic imaging applications operating primarily in the visible light region include, for example, video cameras, facsimile machines, electronic copiers, etc. Electronic imaging applications operating primarily outside the visible light region include infrared (IR) or ultra violet (UV) detectors, spectrum analyzers, etc. The aim of these electronic imaging applications in general is to convert an electromagnetic signal (hereafter referred to as a "source image") into a machine manipulable data representation thereof.

Apparatus for producing machine manipulable data representations of a color source image include means for performing at least two functions, filtering or resolving the source image spectrum, and detecting selected portions of the filtered or resolved source image. Heretofore, these functions have been performed by separate means. For example, U.S. Pat. No. 4,786,964 to Plummer et al discloses an electronic imaging apparatus including separate filtering means and detector means. Multicolor striped or mosaic optical filters filter all but selected spectral components of the source image. Typically, 3 different color filters are employed to distinguish the primary colors. For an additive process, red, green, and blue are commonly used. For a subtractive process, yellow, magenta, and cyan are preferred. Although not specified, these filters are typically gelatin filters (such as dye inside a polyimide coating) as known in the art. These filters are placed over a plurality of charge coupled devices (CCDs) which detect the intensity of the light transmitted by each filter.

The general assembly and operation of the apparatus according to Plummer et al. is representative of the state of the art of color electronic imaging. The device of Plummer et al. happens to be a camera, although other references such as U.S. Pat. No. 4,734,760 to Futaki and U.S. Pat. No. 4,580,889 to Hiranuma et al. disclose other applications of this general operation. In general, however, filtering means (as opposed to resolving means) are used to separate the spectral components of the source image. The difference between the two, as further discussed below, is that filtering means reduce the available image intensity as a function of the number of components to be detected, whereas resolving means allow utilization of the maximum image intensity available, regardless of the number of components to be detected.

One variation on the above involves use of multiple light sources of different color to illuminate an object such as a color document. Light will be absorbed by the object in regions of similar color to the source, and reflected otherwise to produce a source image. Sensors such as the above-mentioned CCDs, photodiodes, or the like may then be used to detect the extent of reflection for each light source color, and by additive or subtractive processes the color composition of the object may be approximated.

Another variation on the above general assembly and operation is disclosed in U.S. Pat. No. 4,709,114 to Vincent. A color source image is caused to be incident upon a stack of dichroic plates which are reflective to selected colors and transmissive to all others. Sensors are positioned such that selected reflected color components of the source image, reflected by one plate of the stack, are individually detected. Alignment of the sensors is crucial in this arrangement in order to distinguish the sensing of individual colors.

Yet another variation of the above-described general embodiment is disclosed in U.S. Pat. No. 4,822,998 to Yokota et al. The filtering means disclosed in Yokota et al. comprises a silicon dioxide body formed to have areas of step-wise increasing thickness to define discrete filtering elements which, taken as a whole, form an interference filter. The greater the thickness of the filtering elements, the longer the transmission wavelength. The sensing means disclosed in Yokota et al. are arrays of photodiodes mounted or formed on the surface of a substrate. These photodiodes may be provided with different sensitivities to operate in conjunction with the filtering elements for sensing selected color components. The interference filter is mounted in either touching or spaced apart relationship to the photodiode arrays such that transmission by each element is caused to be incident upon a photodiode.

Each of the devices of the prior art have shortcomings and disadvantages which have been addressed by the present invention. One problem common to all the above-mentioned apparatus is that most of the light intensity of a given wavelength is not delivered to the sensor intended to sense that wavelength; on the contrary, most of the light intensity of a given wavelength is wasted. Transmission filters such as gelatin films filter light by transmitting certain colors of light and absorbing all others. Gelatin film transmission efficiency is at beast on the order of 50% in the range of colors they are designed to transmit. Furthermore, in order to filter a color source image into a number of components, say N discrete components (N is commonly referred to as the number of bins that source is divided into), there will be at least N filters. Some portion of the source image must fall on each of the filters (i.e., into each bin). If evenly distributed, there will be at best 1/N times the intensity of the source image falling on each filter. Once filtered, there will be at best 50% of this amount falling on the sensing means. The dichroic filters and interference filters have a much higher transmission efficiency than gelatin filters, however, they must also divide the source image N times (into N bits), where N is the number of components to be detected, thus reducing available image intensity by a factor of N.

One aspect of the present invention is the realization that, by utilizing a much greater fraction of the available source image intensity than provided by the prior art, device performance could be enhanced. For example, in a color scanner, scan speed is limited by the rate at which the sensor devices can build up a sufficient accumulation of photogenerated electron-hole pairs (alternatively, the time it takes for a sufficient number of photons to strike the sensor surface). One way to increase this rate is to allow more photons to strike the sensor devices in a given period of time. Thus, for a given lamp intensity, a scanner whose resolving means filters little if any light can scan at a faster rate than one whose resolving means filters portions of the source image intensity. Similarly, for a given scan speed, the lamp intensity may be reduced if more efficient use can be made of the source image intensity; lower power lamps enable smaller power supplies and hence cost reductions. This increase in performance applies not only to scanning devices, but to electronic cameras, sensing devices, and a host of other electronic imaging applications.

Another problem not addressed by the prior art is the presently unfilled need for a full spectrum resolving and sensing apparatus. That is, it is desired to be able to divide the spectrum into a relatively large number of detectable components. The ability to divide the spectrum in this manner facilitates many advantageous uses of spectral information, including mathematical or physical manipulation of the components for various purposes such as conversion of the spectral data into the standard Commission Internationale de l'Eclairage (or CIE) tristimulus values, detection and utilization of subperceptual coded data, compensation for the effects of a colored light source in color original scanning (which allows greater freedom in the selection of light source), measuring the spectral content of ambient light, etc. A practical device capable of spectrally resolving a polychromatic source image into an arbitrary number of elemental components has heretofore been unavailable. The gelatin and dichroic filter arrangements are practical for only a very small number of filters due to the filter size, alignment of filters with sensors, and other limitations. For these filters, additive or subtractive processes are employed to construct the broad color spectrum. The same holds true for multicolored light source apparatus. The technique employing a staircase of deposited-film interference filters allow a large number of components to be separated, but resolution of these devices is limited by the process used to form the lands or steps of the interference filters (limiting the number of lands), diffraction effects in the interference filter, alignment of the interference filter with the sensing elements, etc.

It will be noted that the above prior art relates to filtering. Filtering may be generally defined for the purposes of the present invention as selective removal of portions of a spectrum so as to acquire other selected portions of that spectrum. By spreading the source image into a continuous spectrum, rather than filtering it, a great number of components (i.e., wavelengths) of that spectrum may be sensed. Resolving for the purposes of the present invention may thus be defined as decomposing a source image such that its components (i.e., wavelengths) may be presented spatially separated from one another into a continuous spectrum. Thus, another aspect of the present invention is the provision of an apparatus able to resolve a source image, and able to detect virtually an arbitrary number of elemental components of the source image.

The alignment problem discussed above deserves further mention. In several of the prior art devices discussed above, the filtering elements and the sensing elements are formed separately, then joined. Gelation filters are generally on the order of an inch or less in size. They are often positioned over a great many number of detectors, so that alignment of these filters over the prior detectors, although important, is not critical. Dichroic filters are of a similar scale to gelatin filters, and apparatus incorporating dichroic filters require varying degrees of precision of alignment, but their most common application like that disclosed in U.S. Pat. No. 4,709,144 to Vincent require only a rough alignment to assure that the sensing means receive reflected light from the filters. However, apparatus which use interference filters such as U.S. Pat. No. 4,822,998 to Yokota et al. require more critical alignment of the filter over the detectors. The scale of such devices is small—on the order of 5-10 mm square. Each land or step of the interference filter must be located over at least one preselected detector. Thus, it is another aspect of the present invention to alleviate the need to align the filtering or resolving elements and the sensing elements, or to form either or both in such a way that they are self-aligning.

SUMMARY OF THE INVENTION

The present invention provides a novel apparatus for resolving and sensing the spectral content of an image, overcoming a number of problems and shortcomings of the prior art. The apparatus is particularly well suited for integration into scanning devices, especially color scanning devices, electronic cameras, detectors and other electronic imaging applications.

In addition to the aspects of the present invention discussed above, other aspects include the discovery that the glass or other transparent substrate which detector arrays may be formed on may be used as an optical component in a spectral resolving and sensing apparatus. In particular, the substrate may function as the spectral resolving means for resolving an image incident thereon into its constituent elements. By forming the detector arrays on such a substrate an integral resolving and sensing apparatus is obtained. This leads to certain advantages including the ability to produce a compact resolving and sensing apparatus, the ability to produce a device having self-aligned resolving and sensing means, the ability to produce a device whose efficiency is independent of the number of wavelength components sensed, and others.

Yet another aspect of the present invention is the realization that by utilizing amorphous silicon to form the sensing means and associated circuitry, a page width (8 inches or more) resolving and sensing apparatus may be obtained, and a variety of transparent substrates may be used. Comparing this to crystalline silicon, which is generally grown on a silicon substrate which is opaque, crystalline silicon is a less desirable material from which to form the sensing means.

According to one embodiment of the present invention, a transparent substrate is provided with a beveled side such that light entering the substrate from that side is refracted within the substrate. This refraction separates the individual wavelength components of the incident light such that they strike an adjacent side of the substrate at spatially separated locations. Sensing means in the form of solid state photodetectors are formed on said adjacent side, spaced apart from one another so as to be able to detect selected wavelength components or groups of wavelength components striking that side. Logic and select circuitry are formed by similar processes as, and generally simultaneously on the substrate with the processes forming the sensing means, and are used to determine the level of the wavelength components or groups of wavelength components impinging upon the sensing means. Embodiments operating either within or without the visible light region may be realized.

According to another embodiment of the present invention, a transparent substrate is provided with a diffraction grating on a first surface such that light entering the substrate through the diffraction grating is separated into its individual wavelength components. The separated wavelength components strike a second surface opposite the first surface in spaced apart relation. Sensing means in the form of detectors are formed on the second surface and spaced apart from one another so as to be able to detect selected wavelength components or groups of wavelength components striking that second surface. Alternatively, a reflective coating may be applied to the second surface such that the light, instead of being detected on the second surface, passes through the substrate and is reflected from the second surface to the first surface. A further alternative is the application or formation of a reflective diffraction grating on the second surface, as opposed to the first surface, such that light entering the substrate from the first surface is both diffracted and reflected by the diffraction grating on the second surface. In either case, sensing means in the form of detectors would be formed on the first surface, spaced apart from one another so as to be able to detect selected wavelength components or groups of wavelength components striking that first surface. Logic and select circuitry may also be formed as noted above. Embodiments operating either within or without the visible light region may be realized.

The embodiments of the present invention are united by the fact that the substrate upon which the sensors are formed serves as an optical component of the resulting apparatus. The substrate may function as the resolving means itself, or may have attached to it or formed in it the resolving means in such a manner that the resolved source image is transmitted by the substrate to the sensors.

The scope of the present invention, including further embodiments and the manner in which it addresses the problems associated with prior art, will become more readily apparent from the following detailed description when taken in conjunction with the accompanying drawings and claims.

BRIEF DESCRIPTION OF THE DRAWINGS

FIG. 7b shows in profile view a diffraction grating of the type used in the embodiment of FIG. 7a.

DETAILED DESCRIPTION

A novel spectral resolving and sensing apparatus employing the aspects listed above, as well as others, will now be described. The following description will be primarily in terms of an embodiment particularly well suited to a color scanning apparatus, with other embodiments discussed where appropriate. It will be appreciated, however, that the spirit and scope of the present invention encompass many other embodiments and applications. Thus, the following description is limited only for the purposes of clarity, and should not be read as limiting the scope of the present invention.

Figure 1:
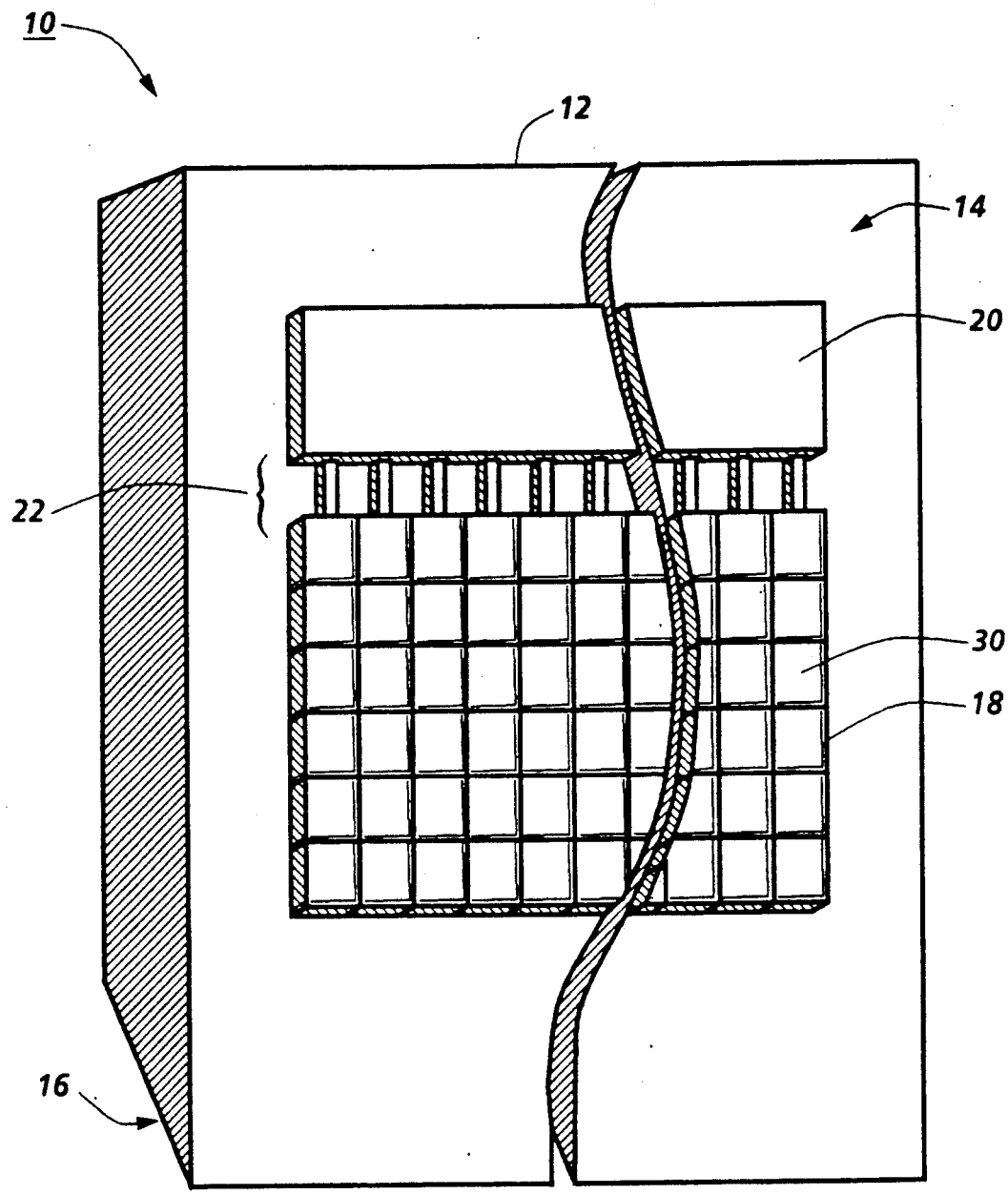
FIG. 1 shows a perspective view of an integral spectral resolving and sensing apparatus according to the present invention.

Referring first to FIG. 1, a spectral resoling and sensing apparatus 10 is shown according to a first embodiment of the present invention. Apparatus 10 includes a substrate 12 preferably of glass or similar suitably optically transparent material, such as Corning 7059 manufactured by the Corning Glass Company, fused silica material, or the like upon which small-scale integrated circuitry may be formed. Substrate 12 will be of sufficient quality that it should be free of internal imperfections of wavelength magnitude. Similarly, it should be free of external imperfections of wavelength magnitude. It should also be flat relative to its thickness so that transmitted images will not be distorted. Substrate 12 will preferably be colorless, although compensation may be made for the color of the substrate as discussed below. Substrate 12 is formed to have two surfaces of particular configuration and orientation, planar primary surface 14, and adjacent planar secondary surface 16. Secondary surface 16 is beveled relative to primary surface 14 such that the angle $\alpha$ between the two surfaces is less than 90° as shown more clearly in FIG. 3. The angle $\alpha_1$ will be selected in accordance with the selected placement of a detector array and other selected circuitry on primary surface 14 as discussed in further detail below.

Formed on primary surface 14 of substrate 12 will be detector array 18 composed of individual detectors 30, discussed in further detail below with regard to FIG. 2. The formation of detector array 18 may be by semiconductor processing steps well known in the art. Detector array 18 will be at least in part composed of a semiconductive material such as silicon, germanium, alloys of these and other materials, etc. Specifically, it is desirable to produce relatively large width devices, on the order of 8 inches or more, to enable scanning an entire page width without need for corrective optics, motion of the sensors, etc. Due to the ability to form large area microelectronics of amorphous silicon (a-Si:H), the presently described scanner embodiment, and others, are conveniently formed of a-Si:H.

Also formed on primary surface 14 of substrate 12 will be logic and select circuitry 20. The formation of logic and select circuitry 20 will also preferably be by semiconductor processing steps known in the art. Specifically, logic and select circuitry 20 will be formed by similar processes as and in conjunction with the formation of detector array 18. Electrical interconnection 22 is formed also be similar processes as and in conjunction with the formation of detector array 18 on primary surface 14 connecting detector array 18 and logic and select circuitry 20. It will now be appreciated that the complete scanning electronics may be formed of similar materials and by similar processing steps upon a substrate which is capable of functioning as a means for resolving a polychromatic image. Thus, a compact, self contained scanning head of the type employed in document scanners and the like may be simply and conveniently formed by fabrication techniques known in the art.

Figure 2:
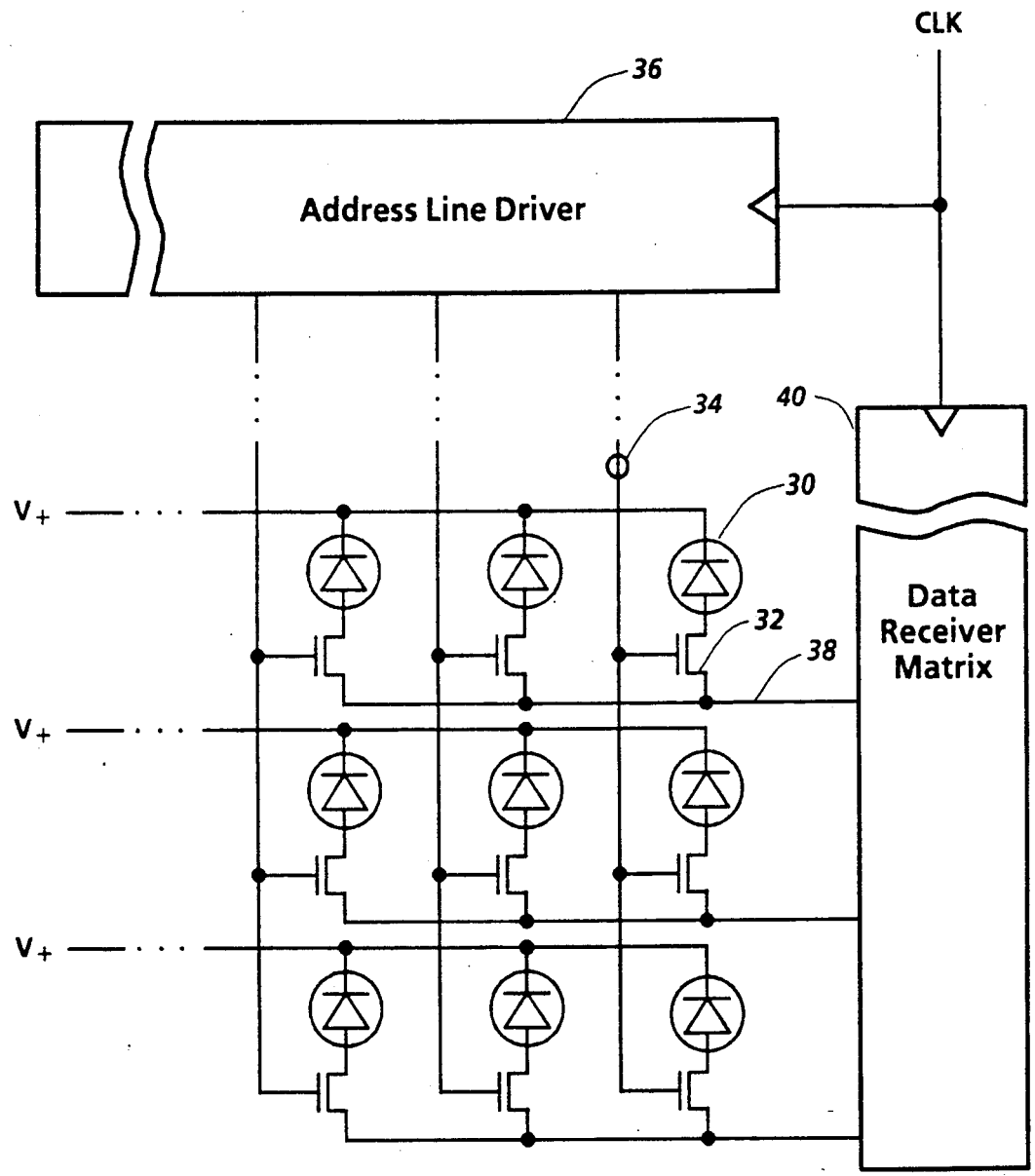
FIG. 2 shows a schematic illustration of a detector circuit which may be employed in devices according to the present invention.

In order that the simplicity of the resolving and sensing apparatus be carried through into the circuitry of detector array 18 and logic and select circuitry 20, an arrangement such as that shown in FIG. 2 may be utilized. Detector array 18 is fabricated by standard thin film deposition techniques such that individual detectors 30 are at a density of for example 300 to 400 detectors per inch in each direction. At 300 detectors per inch, each detector would be, for example, 2.5 mils on each side, spaced from one another by 0.8 mils. It may, in some applications, be desirable to vary the shape of the individual detectors from square. For example, it may be desirable to form the individual detectors rectangular in planform. Alternatively, it may be desirable to form the individual detectors of uniform width but varying length to account for different transmission coefficients for different wavelengths (longer for longer wavelengths). Detectors 30 may be one of a variety of configurations, such as p-i-n or Schottky-barrier photodiodes or gap-cell photoconductors. One effective configuration is the gap cell photoconductor structure described in U.S. Pat. No. 4,646,163 to Tuan et al., which is fully incorporated herein by reference thereto.

According to the circuit of FIG. 2, applied to each detector 30 is a voltage $V_+$. It will be assumed for this description only that each photodetector 30 is of the photoconductive variety. Each detector is also connected to the source of a transistor 32. The gate of each transistor 32 is connected to an address line 34, which is in turn connected to an address line driver 36, which is part of logic and select circuitry 20 of FIG. 1, and which can selectively apply an address potential A, equal to at least the turn on voltage of transistor 32. Each address line 34 connects a plurality of transistors 32 in columnar arrangement, each column representing a selected spectral component or group of components to be detected. The drain of each transistor 32 is connected in row fashion to a data line 38, which is in turn connected to the input terminals of a data receiving matrix 40, which is also part of logic and select circuitry 20 of FIG. 1. Each row of detectors 30 corresponds to a portion of the source image, i.e., a pixel. Address line driver 36 and data receiving matrix 40 must be synchronized in order that meaningful data may be retrieved from the array of detectors 30. This synchronization may be accomplished by inputting a clock signal to each of address line driver 36 and data receiving matrix 40 via line CLK.

In operation, the illumination of a selected detector 30, corresponding to a spectral component or components of a portion of the source image, may be detected by applying to the appropriate address line 34 the voltage A. By so doing, each transistor connected to address line 34 is put into the "on" state (made conductive). When little or no light falls on detector 30 (i.e., few or no photons strike the detector's surface) its conductivity is very low and little current is permitted to flow therethrough. Little if any current will be allowed to pass through detector 30, across transistor 32, to data receiver matrix 40. Conversely, when light falls on the detector 30 its resistance is lowered and current is allowed to flow through it. As the detector resistance is much lower when fully illuminated, the potential drop thereacross is minimal, causing the potential drop across transistor 32 also to be minimal. Maximum current is then allowed to pass through detector 30 and transistor 32 to the input terminals of data receiving matrix 40. By noting the conditions of the address line driver 36 and data receiving matrix 40, it is possible to determine the state of illumination (i.e., illuminated or not illuminated) of any detector 30. In fact, since resistivity of detector 30 varies as a function of the level of illumination thereof, it is possible to determine the relative level of illumination of (i.e., approximate light energy incident upon) each detector 30. In embodiments using detectors 30 of the photodiode variety, absorbed photons generate electron-hole pairs which are separated by the internal electric fields in the photodiode; this stored charge is then drained out and measured when the appropriate transistor is turned on by methods described or known in the art.

Figure 3:
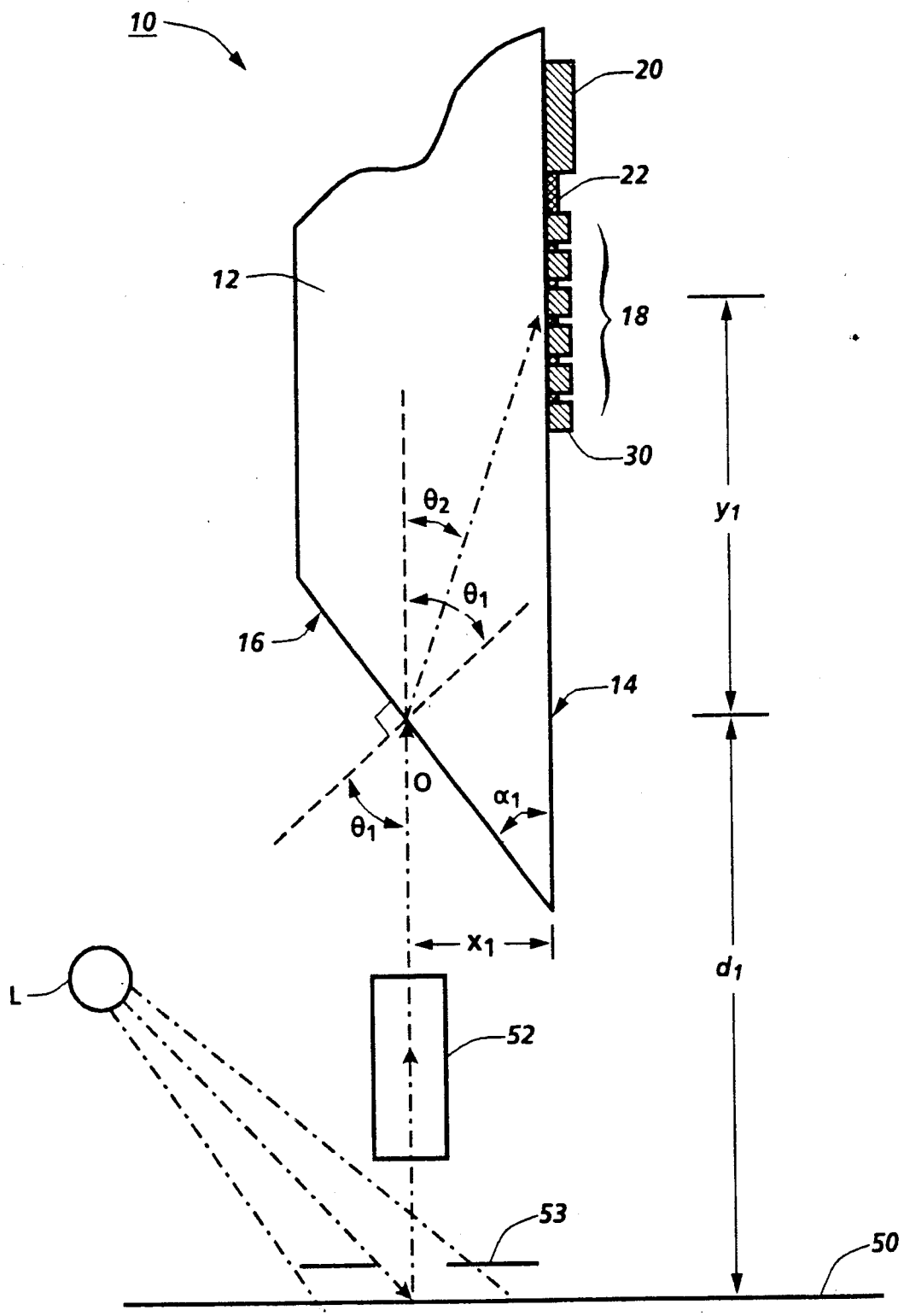
FIG. 3 shows in profile view a device according to one aspect of the present invention in which spectral resolution is accomplished by refraction.

Physical operation of the spectral resolving and sensing apparatus 10 is illustrated in the profile view of FIG. 3. As between all figures herein, like reference numerals will be used to refer to like elements. Apparatus 10 will be positioned proximate an object to be scanned, which may, for example, be an image bearing document 50. An illumination source L will be positioned to illuminate a portion of the document 50 to be scanned. Illumination source L will preferably be uniformly polychromatic, that is, some amount of illumination across the spectrum, although compensation may be made for nonuniformity as discussed below. Located between apparatus 10 and document 50 will be focussing means 52, such as a fiber array lens of the type produced by Nippon Sheet Glass (Japan) under the name SelFoc lens. The SelFoc lens is a preferred focussing means since it is available in page widths such as 8 inches or more. By using such lenses with the present apparatus, full page width scanners may conveniently be produced. Also located between apparatus 10 and document 50 will be image limiting means 53, such as a plate having a slit or aperture therein. Image limiting means 53 serves to physically divide the source image. Such division may be into individual pixels or into a row or column of pixels, with separation of the row or column into individual pixels left to other means such as the detectors.

The distance $d_1$ between the image receiving region of secondary surface 16 and document 50 will be determined by the material selected for substrate 12, the angle of incidence $\theta_1$ of object line O, which represents the center of the focal plane of the source image, and the focal length of focussing means 52. The distance $d_1$ may be on the order of several centimeters or more. Means for directing the optical path, such as a mirror (not shown) well known in the art may also be employed to produce a compact scanning device as application of the present invention dictates.

Location and orientation of the individual detectors 30 is determined as follows from two governing principles. The first is refraction of light as it passes from a first medium having a first index of refraction $n_1$ to a second medium having a second index of refraction $n_2$. This principle is realized by Snell's law which states that the angle of incidence $\theta_1$ is related to the angle of refraction $\theta_2$ by $$n_1 \sin \theta_1 = n_2 \sin \theta_2 \quad (1)$$

From the geometry of the device of FIG. 3 the relationship between the angles of incidence and refraction and the horizontal and vertical distances, x and y, of the optical path can be derived as $$x/y = \tan(\theta_1 - \theta_2) \quad (2)$$

The second principle is that the indices of refraction of certain media, such as glass, vary smoothly as a function of wavelength over the visible region of the spectrum. Prisms function due to the fact that the index of refraction of the materials from which they are formed is higher for shorter wavelengths. Specifically, the spatial separation of blue to red light is on the order of 0.005 times the average path length for glass. By combining expressions (1) and (2) a relationship may be established between the angle of incidence, horizontal and vertical path lengths, and the index of refraction of the substrate $$y = x/\tan[\theta_1 - \sin^{-1}(\sin \theta_1/n_2)] \quad (3)$$

This relationship may then be used to calculate the vertical location y of elements of the detector array 18 such that selected wavelengths are detected. An arbitrary number of wavelengths have been selected for calculation of y for the device of FIG. 3. The results of these calculations are shown in Table 1. Two different substrate materials, fused silica and the aforementioned Corning 7059 product, have been considered for illustration purposes. For the purposes of sample calculations, x has been taken as 1 mm, and $\theta_1$ has been taken to be 10°.

It should be noted from Table 1 that the difference between successive y values for the various wavelengths used for sample calculations is greater than the device size capable of being produced by the aforementioned processes. Thus, it is possible to resolve and detect at least the above wavelengths from a polychromatic source image, and in fact it is possible to resolve and detect even smaller increments of wavelengths. This points out that the present limitation on the detectable resolution of a spectral resolving and sensing apparatus according to the present invention is the center to center spacing of the elements of the detector array. Photolithographic equipment for defining patterns on large (14 inch) substrates presently available can produce feature sizes as small as 2 μm and is commonly used to produce devices as small as 10 μm on a side. As can be inferred from Table 1, 10 μm sensors with 5 μm spacing would correspond to the ability to split the spectrum into 20 nm bins. As the technology underlying the formation of the detectors improves, a reduction in the

TABLE 1

| Wavelength (nm) | Fused Silica | | Corning 7059 | |
|---|---|---|---|---|
| | Index of refraction | y(μm) | Index of refraction | y(μm) |
| 404 | 1.46968 | 17806 | * | * |
| 480 | * | * | 1.5391 | 16248 |
| 546 | * | * | 1.5347 | 16335 |
| 589 | 1.45845 | 18102 | 1.5326 | 16377 |
| 643 | * | * | 1.5305 | 16419 |
| 706 | 1.45517 | 18191 | * | * | possible center to center spacing is almost certain to occur. It will be appreciated by those skilled in the art that incorporations of such an improvement into the teachings of the present invention will be only an obvious extension of the present invention, and would not depart from its spirit and scope.

The above-described operation of the integral spectral resolving and sensing apparatus according to the present invention implies several important advantages over the prior art. First, by resolving the source image, as opposed to filtering it, a device capable of utilizing up to 100% of the available source image intensity is obtained. Second, a greater than heretofore available number of wavelength components may be detected due to the integral nature of the resolving means and the small scale of the detectors. Further advantages flowing from the structural and operational aspects of the present invention will now be described with reference to additional embodiments of the present invention.

Figure 4:
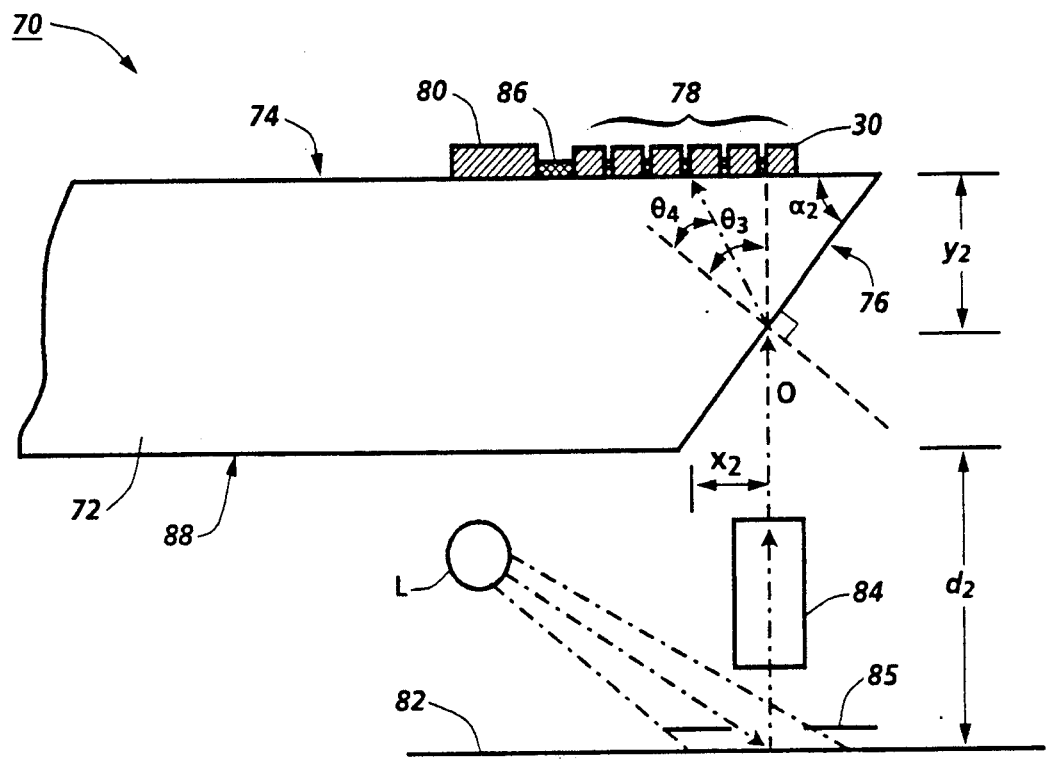
FIG. 4 shows in profile view a device according to another aspect of the present invention in which spectral resolution is accomplished by refraction.

FIG. 4 shows another embodiment of the present invention similar in many respects to the embodiment shown in FIG. 3. In FIG. 4, a spectral resolving and sensing apparatus 70 is shown which includes, inter alia, a substrate 72 having a primary surface 74 and a secondary surface 76. Formed on primary surface 74 is a detector array 78, logic and select circuitry 80, and electrical interconnection 86, similar to that discussed above with reference to the embodiment shown in FIG. 2. The apparatus is placed a distance $d_2$ from the surface of an image bearing document 82. An illumination source L is positioned to illuminate a portion of the document 82 to be scanned. Interposed between apparatus 70 and document 82 is focussing means 84 and image limiting means 85 of the type previously described. Similar to the calculation of $d_1$, the distance $d_2$ will be determined by the choice of material for substrate 72, the angle of incidence $\theta_3$ of object line O, and the focal length of focussing means 84. The principles of operation of the embodiment of FIG. 4 are those previously discussed, and the rules governing operation are essentially the same. Expression (1) above applies and is rewritten in terms of the new angles $\theta_3$ and $\theta_4$ as $$n_1 \sin \theta_3 = n_2 \sin \theta_4 \quad (5)$$

However, the modification to the device geometry means that $$y/x = \tan(\theta_3 - \theta_4) \quad (6)$$

replaces expression (2) above. This results in a new expression for the distance x along the direction of diffraction $$x/y = \tan[\theta_3 - \sin^{-1}(\sin \theta_3/n_2)] \quad (7)$$

Table 2 may then be constructed of the results of calculations performed to yield horizontal location x of elements of the detector array 78 such that selected wavelengths are detected. Again, both fused silica and the aforementioned Corning 7059 product have been considered for illustration purposes. For the purposes of sample calculations, y has been taken as 3 mm, and $\theta_3$ has been taken to be 40°.

It should be noted from Table 2 that the difference between successive x values for the various wavelengths used for sample calculations is smaller than the device size capable of being produced by the aforementioned

TABLE 2

| Wavelength (nm) | Fused Silica | | Corning 7059 | |
| --- | --- | --- | --- | --- |
| | Index of refraction | x(μm) | Index of refraction | x(μm) |
| 404 | 1.46968 | 752 | * | * |
| 480 | * | * | 1.5391 | 822 |
| 546 | * | * | 1.5347 | 817 |
| 589 | 1.45845 | 740 | 1.5326 | 815 |
| 643 | * | * | 1.5305 | 813 |
| 706 | 1.45517 | 736 | * | * | processes. However, as pointed out above, advances in the state of the art are likely to produce detector arrays having center to center spacing compatible with this embodiment of the present invention. Thus, it will be appreciated by those skilled in the art that incorporation of such an advancement into the teachings of the present invention will be only an obvious extension of the present invention, and would not depart from its spirit and scope.

In each of the above described embodiments, the object line O has been assumed to be either parallel or perpendicular to the primary surface upon which the sensors reside. In either case it is contemplated that the object line O may be incident upon the substrate other than parallel or perpendicular with the primary surface, and the calculations for such embodiments follow from those presented above. Specifically, with regard to FIG. 3, $\alpha_1$ may be 90 degrees or other angle such that object line O is incident thereupon at an angle other than 90 degrees. Refraction will still occur and the desired resolving and sensing will result. With regard to FIG. 4, the same holds true for $\alpha_2$. Furthermore, it is possible to arrange the apparatus such that object line O is incident on a tertiary surface 88 at an angle other than 90 degrees. Again, the substrate will have the desired effect of refracting the incoming source image, which will be resolved and sensed as described above.

Figure 5:
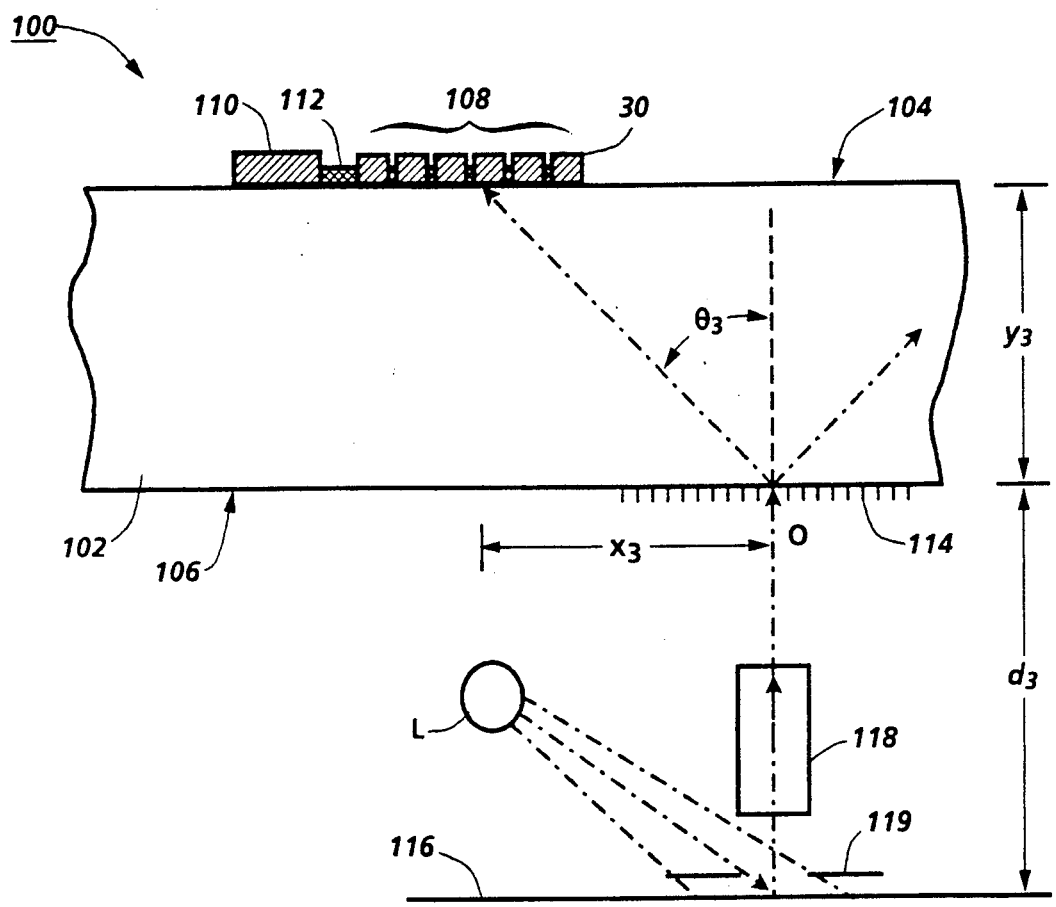
FIG. 5 shows in profile view a device according to one aspect of the present invention in which spectral resolution is accomplished by diffraction.

FIG. 5 shows an embodiment of the present invention employing diffraction grating principles with the above described deposition of detectors on an optically transmissive substrate. In the embodiment, an image resolving and sensing apparatus 100 includes a substrate 102 having a primary surface 104 and a secondary surface 106. Substrate 102 is of an optically transparent material of a type exhibiting low loss, smooth diffraction characteristics and of a type upon which small-scale integrated circuitry may be formed. Again, fused silica, Corning 7059, and the like are examples of suitable substrate material.

Formed on primary surface 104 is detector array 108. Formation of detector array 108 will preferably be in accordance with semiconductor processing methods well known in the art, as described above with reference to FIG. 1. Also formed on primary surface 104 will be logic and select circuitry 110, and electrical interconnection 112 which function as described above.

Formed on secondary surface 106 is diffraction grating 114. Formation of diffraction grating 114 may be by deposition or by etching. It may be formed prior to formation of detector array 108, logic and select circuitry 110, and electrical interconnection 112. By way of example, diffraction grating 114 may be formed, prior to formation of detector array 108, logic and select circuitry 112, and the electrical interconnection, by semiconductor processing well known in the art. That is, diffraction grating 114 may be either formed in relief upon or prefabricated and secured by suitable adhesive to secondary surface 106. Where diffraction grating 114 is formed upon secondary surface 106, aluminum, silicon, silicon nitride, polyimide, etc., is deposited by methods known in the art to a thickness of 0.1 to 3 μm. Photolithographic techniques may then be employed to etch the deposited material forming a plurality of parallel lines which, taken together, form a diffraction grating. A further viable alternative is forming diffraction grating 114 by micromachining a plurality of generally parallel grooves in substrate 102 by methods known in the art.

Apparatus 100 will be positioned proximate an object to be scanned, such as image bearing document 116. An illumination source L is positioned to illuminate a portion of the document 116 to be scanned. Located between apparatus 100 and document 116 will be focusing means 118, such as the aforementioned SelFoc lens, and image limiting means 118 as discussed above.

Location and orientation of the detector array 108 in the present embodiment is governed by two principles. The first relates to the scattering of light incident upon a diffraction grating, which is governed by Bragg's law, $$\theta_m = \sin^{-1}[m(\lambda/a)] \qquad (7)$$

where $\theta_m$ is the angle of diffraction of order m for light of wavelength λ incident on a grating of equal spacing a. Noting that the angle $\theta_m$ is dependent on wavelength λ, it will be appreciated that polychromatic light incident upon the diffraction grating will be dispersed in the substrate. The second principle is the refraction that occurs when light travels from a first medium to a second medium of different refractive index (i.e., into the substrate) causing further dispersion. The extent of the dispersion is governed by Snell's law, equation (1) above. By combining the results of calculating diffraction angle according to each of equations (1) and (7) Table 3 can be derived. The values of the displacement x from the object line O may be calculated according to $$x = y \tan \theta_m \qquad (8)$$

Table 3 is calculated for first order diffraction (m = +1), where the grating spacing was assumed to be a uniform 10 μm, which is within the range of realizable geometry of photolithographic techniques known in the art, and the substrate thickness y has been assumed to be 1 mm.

Figure 6:
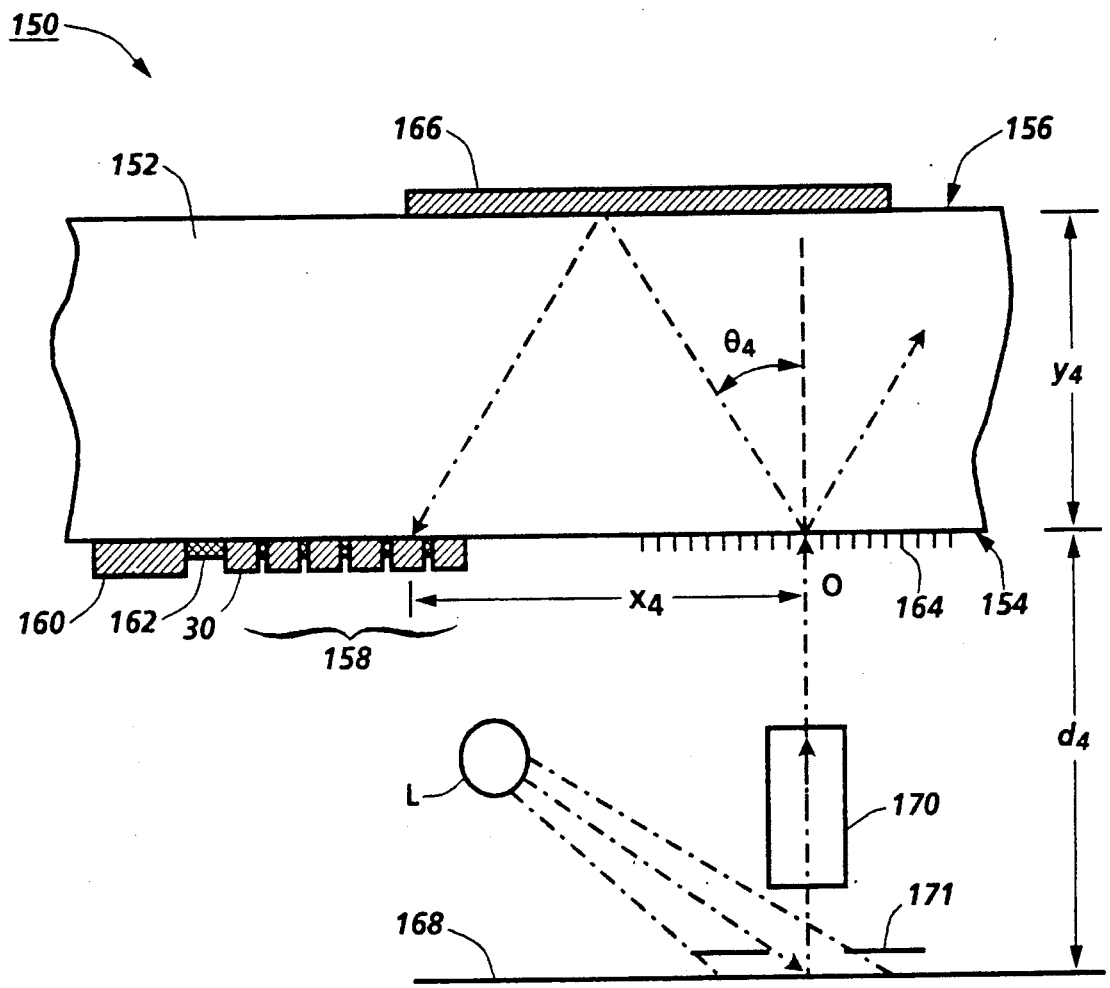
FIG. 6 shows in profile view a device according to another aspect of the present invention in which spectral resolution is accomplished by diffraction.

Another embodiment of the present invention is shown in FIG. 6, similar in many respects to the embodiment shown in FIG. 5. In FIG. 6, a spectral resolving and sensing apparatus 150 is shown which includes, inter alia, a substrate 152 having a primary surface 154 and a secondary surface 156. Substrate 152 is of an optically transparent material of a type exhibiting low loss, smooth diffraction characteristics and of a type upon

TABLE 3

| Wavelength (nm) | Diffraction angle $\theta_m$(deg.) | x(μm) |
|---|---|---|
| 400 | 2.29 | 40 |
| 500 | 2.87 | 50 |
| 600 | 3.44 | 60 |
| 700 | 4.01 | 70 | which small-scale integrated circuitry may be formed. Again, fused silica, Corning 7059, and the like are examples of suitable substrate material.

Formed on primary surface 154 is detector array 158. Formation of detector array 158 will preferably be in accordance with semiconductor processing methods well known in the art, as described above with reference to FIGS. 1–3. Also formed on primary surface 154 will be logic and select circuitry 160, and electrical interconnection 162 which function as described above.

In the present embodiment, a diffraction grating 164 is also formed on primary surface 154. This should be distinguished from the formation of the diffraction grating on the secondary surface of the embodiment shown in FIG. 5. Formation of diffraction grating 164 may be by deposition, mechanical attachment, or by etching. Although diffraction grating 164 may be formed prior to or after formation of detector array 158, logic and select circuitry 160, and the electrical interconnection 162, the present embodiment is advantageous in that the diffraction grating 164 may be formed simultaneous with the formation of these other elements. That is, together with depositing material for the detectors, circuitry and interconnection, material for the diffraction grating may be deposited. During the etching of the material to form the detectors, circuitry and interconnection, the diffraction grating may be etched. This means that the structure is self aligning. It also means that fabrication processes are greatly simplified and shortened.

Formed on secondary surface 156 is reflection coating 166. A mirror coating may be applied by depositing aluminum, chromium, silver, etc., on secondary surface 156 where appropriate to form reflection coating 166.

Apparatus 150 will be positioned proximate an object to be scanned, such as image-bearing document 168. An illumination source L is positioned to illuminate a portion of the document 168 to be scanned. Located between apparatus 150 and document 168 will be focussing means 170, such as the aforementioned SelFoc lens, and image limiting means 171, as described above.

Location and orientation of the detector array 168 in the present embodiment is governed by both Snell's law, equation (1), and Bragg's law, equation (7). By combining the results of calculating diffraction angle according to each of equations (1) and (7) Table 4 can be derived. The values of the displacement x from the object line O may be calculated according to equation (8) above. In Table 4, first order diffraction (m=+1) has been assumed, the grating spacing was assumed to be a uniform 10 μm, which is within the range of realizable geometry of photolithographic techniques known in the art, and the substrate thickness y has been assumed to be 1.5 mm (thus, the total path length is 2 times y, or 3 mm).

TABLE 4

| Wavelength (nm) | Diffraction angle $\theta_m$(deg.) | x(μm) |
|---|---|---|
| 400 | 2.29 | 120 |
| 500 | 2.87 | 150 |
| 600 | 3.44 | 180 |
| 700 | 4.01 | 211 |

Figure 7A:
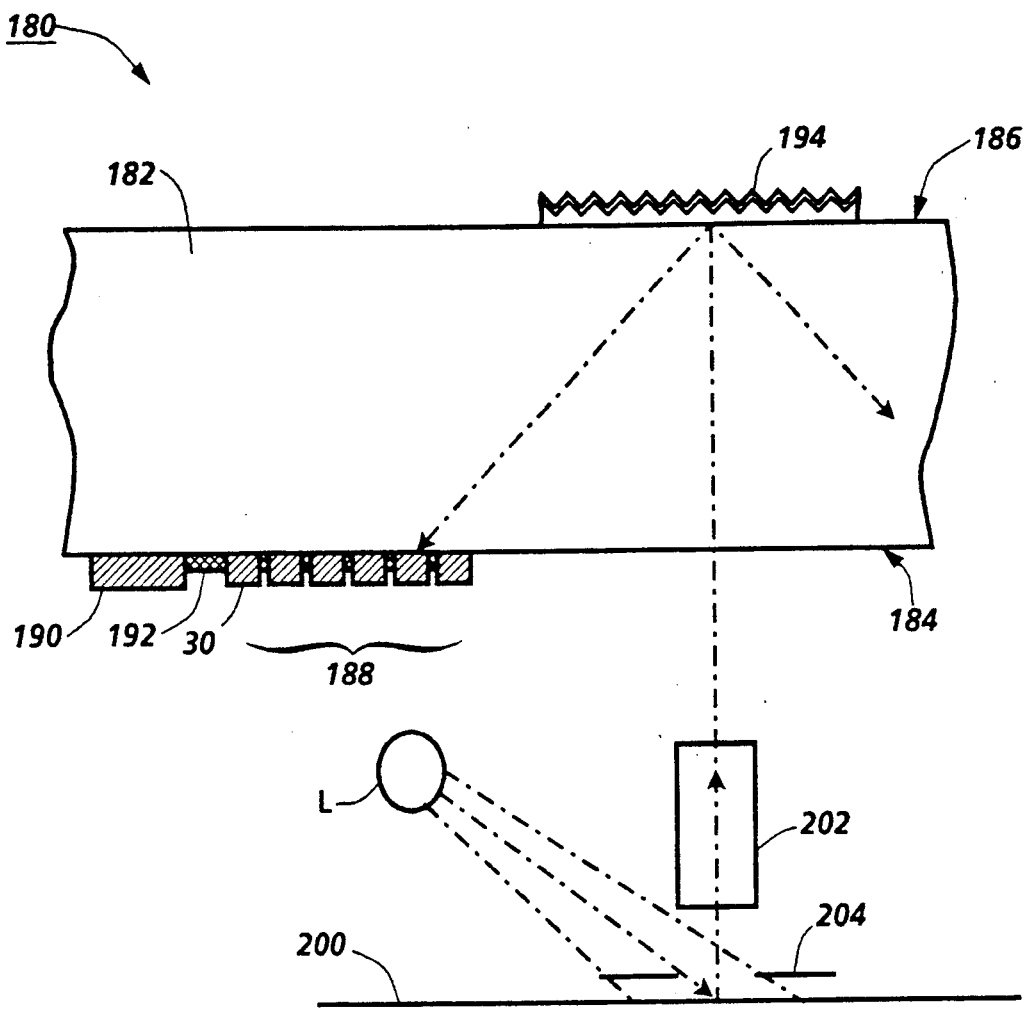
FIG. 7a shows in profile view a device according to yet another aspect of the present invention in which spectral resolution is accomplished by diffraction.
Figure 7B:
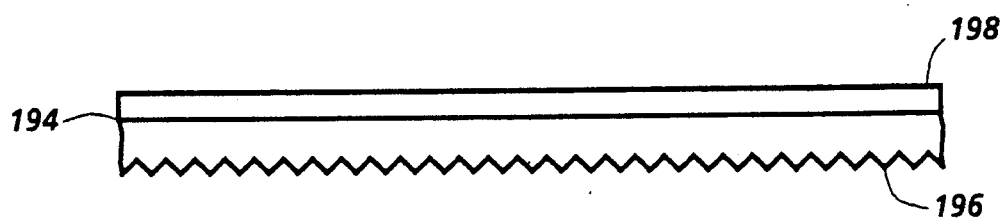

Yet another embodiment of the present invention is shown in FIGS. 7a and 7b, similar in many respects to the embodiment shown in FIGS. 5 and 6. In FIG. 7a, a spectral resolving and sensing apparatus 180 is shown which includes, inter alia, a substrate 182 having a primary surface 184 and a secondary surface 186. Substrate 182 is of the optically transparent material type described above.

Formed on primary surface 184 is detector array 188. Formation of detector array 188 will preferably be in accordance with semiconductor processing methods well known in the art, as described above with reference to FIG. 1–3. Also formed on primary surface 184 will be logic and select circuitry 190, and electrical interconnection 192 which function as described above. Deposited, attached, or formed on secondary surface is diffraction grating 194 according to the teachings above. Diffraction grating 194 will be of the reflective type, for example having one surface 196 with a diffraction grating thereupon and a second surface 198 opposite the first surface having a reflective coating deposited thereupon, as shown in FIG. 7b.

Returning to FIG. 7a, apparatus 150 will be positioned proximate an object to be scanned, such as image-bearing document 200. An illumination source L is positioned to illuminate a portion of the document 200 to be scanned. Located between apparatus 180 and document 200 will be focussing means 202, such as the aforementioned SelFoc lens, and image limiting means 204, as described above.

Location and orientation of the detector array 188 in the present embodiment is governed by both Snell's law, equation (1), and Bragg's law, equation (7). The calculations of detector position are similar to those presented above with regard to FIG. 5, with the possible exception of addition refraction, if any, of light within the substrate prior to its incidence upon the diffraction grating.

Each of the above-mentioned embodiments utilizing a diffraction grating share several advantages over the prior art. Those include, first, that it is possible to shape the diffraction grating in order to maximize the light energy falling into the first order. This maximizes the detectable light energy and hence increases the efficiency of the device. Diffraction gratings are shaped by adjustment of the blaze angle. See, F. L. Pedrotti and L. S. Pedrotti, Introduction to Optics, Prentice-Hall, 1987, pp. 419–422. Second, it is possible to control the angle of diffraction by varying the diffraction grating geometry. This allows greater control over the resulting device geometry and size. While these are some of the advantages provided by utilizing a diffraction grating as a resolving means, this should not be read to limit the applicability of other embodiments described or implied herein—each application of the present invention will of course have its unique requirements.

As will be clear to one skilled in the art, attention must be payed in all embodiments to the fact that the focal plane of the spectrally resolved image pixel is not necessarily parallel with the plane on which the sensors are formed. The restrictions are most severe on the embodiment shown in FIG. 3, where the greater the difference between these two planes (mathematically equal to $\alpha_{(1,2)}+\theta_1-\theta_2$), the smaller the number of spectral bins into which the signal may be reliably resolved. In the embodiments employing a diffraction grating, the difference between the two planes is on the order $\theta_m$ (typically a few degrees), and so the effects on spectral purity are small.

In general, to those skilled in the art to which this invention relates, many changes in construction and widely differing embodiments and applications of the present invention will suggest themselves without departing from its spirit and scope. For example, a compact spectral resolving and sensing apparatus such as that described above, would find particular applicability in handheld light meters. As opposed to the page wide detector arrays of 8 inches or more described above, small arrays, on the order of an inch wide or less would be formed on a correspondingly sized substrate together with other associated elements of the detectors described above. The resulting device could be used for measuring the chromatic content of light in a selected environment.

Furthermore, the above description has been from the point of view of a color scanner operating in the visible light range. The invention herein described and claimed is equally applicable outside the visible light region of the electromagnetic spectrum. For example, by properly positioning the detectors of any of the aforementioned apparatus it is possible to detect wavelengths shorter or longer than the visible light region. The factor limiting the detectable wavelengths will be the detector size on the short wavelength end and overall device size on the long end. Thus, the disclosures and descriptions herein are illustrative, and are not intended to be in any sense limiting.

What is claimed is:

1. An apparatus for sensing on at least a partially page-wide basis one or more selected spectral components or groups of spectral components of an electromagnetic signal representing a scan line of a scanned document, comprising:
   substantially page-wide means for resolving the electromagnetic signal into a continuous spectrum; and
   means formed on said resolving means for sensing one or more selected spectral components of said spectrum on at least a partially page-wide basis.

2. An apparatus for resolving a polychromatic electromagnetic signal representing a scan line of a scanned document into a continuous spectrum and for sensing on at least a partially page-wide basis a selected set of discrete spectral components of said spectrum, comprising:
   substantially page-wide means for resolving the polychromatic electromagnetic signal into a continuous spectrum; and
   means formed on said resolving means for sensing one or more selected discrete spectral components of said spectrum on at least a partially page-wide basis.

3. The apparatus of claim 2, wherein said sensing means comprise one or more solid state photoreceptors formed by photolithographic processes.

4. The apparatus of claim 3, wherein said one or more solid state photoreceptors are formed at least in part of amorphous silicon.

5. The apparatus of claim 4, wherein said means for resolving comprises an optically transparent substrate having a primary surface upon which said one or more solid state photoreceptors are formed.

6. The apparatus of claim 5, wherein said substrate has an adjacent surface adjacent said primary surface beveled so as to enable said substrate to act as a means for refracting light.

7. The apparatus of claim 6, wherein said one or more solid state photoreceptors are positioned such that when said polychromatic electromagnetic signal is made incident upon said adjacent surface and is refracted within said substrate and thereby spatially resolved into a continuous spectrum, said one or more solid state photoreceptors are capable of detecting the presence or absence of said one or more selected discrete spectral components.

8. The apparatus of claim 7, further comprising logic circuitry for determining which if any of said one or more photoreceptors detect the presence of said one or more selected discrete spectral components.

9. The apparatus of claim 8, wherein said logic circuitry if formed on said primary surface by substantially the same photolithographic processes as and substantially simultaneously with the formation of said one or more solid state photoreceptors.

10. The apparatus of claim 9 wherein said logic circuitry is formed at least in part of amorphous silicon.

11. An apparatus for resolving a polychromatic electromagnetic signal representing a scan line of a scanned document into a continuous spectrum and for sensing on at least a partially page-wide basis a selected set of discrete spectral components of said spectrum, comprising:
   a substantially page-wide, generally transparent substrate, having a primary surface, and forming an optical component of said apparatus;
   substantially page-wide means for resolving the polychromatic electromagnetic signal into a continuous spectrum disposed on said substrate; and
   means for sensing one or more selected discrete spectral components of said spectrum on at least a partially page-wide basis formed on said substrate such that said polychromatic electromagnetic signal is resolved by said resolving means and thereafter transmitted through said substrate to said sensing means.

12. The apparatus of claim 11, wherein said sensing means comprise one or more solid state photoreceptors formed by photolithographic processes.

13. The apparatus of claim 12, wherein said one or more solid state photoreceptors are formed at least in part of amorphous silicon.

14. The apparatus of claim 13, wherein said resolving means comprises a prism.

15. The apparatus of claim 14, wherein said prism is located on said primary surface, wherein said substrate includes an opposite surface opposite said primary surface, and further wherein said solid state photoreceptors are located on said opposite surface and positioned such that when said polychromatic electromagnetic signal is made incident upon said prism and refracted thereby in transmission and further refracted within said substrate and thereby spatially resolved into discrete elements, said one or more solid state photoreceptors are capable of detecting the presence of absence of said one or more selected discrete spectral components.

16. The apparatus of claim 15, further comprising logic circuitry for determining which if any of said one or more solid state photoreceptors detect one or more of said selected discrete spectral components.

17. The apparatus of claim 16, wherein said logic circuitry is formed on said opposite surface by substantially the same photolithographic processes as and substantially simultaneously with the formation of said one or more solid state photoreceptors.

18. The apparatus of claim 13, wherein said resolving means comprises a diffraction grating.

19. The apparatus of claim 18, wherein said diffraction grating is formed on said substrate by substantially the same photolithographic processes as and substantially simultaneously with the formation of said one or more solid state photoreceptors.

20. The apparatus of claim 18, wherein said diffraction grating is formed by machining said diffraction grating into said substrate.

21. The apparatus of claim 18, wherein said diffraction grating is located on said primary surface, wherein said substrate includes an opposite surface opposite said primary surface, and further wherein said solid state photoreceptors are located on said opposite surface and positioned such that when said polychromatic electromagnetic signal is made incident upon said diffraction grating and diffracted thereby in transmission and further refracted within said substrate and thereby spatially resolved into discrete elements, said one or more solid state photoreceptors are capable of detecting the presence or absence of said one or more selected discrete spectral components.

22. The apparatus of claim 21, further comprising logic circuitry for determining which if any of said one or more solid state photoreceptors detect one or more of said selected discrete spectral components.

23. The apparatus of claim 22, wherein said logic circuitry is formed on said opposite surface by substantially the same photolithographic processes as and substantially simultaneously with the formation of said one or more solid state photoreceptors.

24. The apparatus of claim 18, wherein said substrate includes an opposite surface opposite said primary surface, wherein means for reflecting are located on said opposite surface, wherein said diffraction grating is located on said primary surface, wherein said one or more solid-state photoreceptors are located on said primary surface adjacent to said diffraction grating and positioned such that when said polychromatic electromagnetic signal is made incident upon said diffraction grating and diffracted thereby in transmission in a direction from said primary surface towards said opposite surface, and further refracted within said substrate and thereby spatially resolved into discrete elements, and reflected by said reflecting means in a direction from said opposite surface towards said primary surface, said one or more solid state photoreceptors are capable of detecting the presence or absence of said one or more selected discrete spectral components.

25. The apparatus of claim 24, wherein said diffraction grating and said one or more solid state photoreceptors are formed by substantially the same photolithographic processes substantially simultaneously on said primary surface.

26. The apparatus of claim 25, further comprising logic circuitry for determining which if any of said one or more solid state photoreceptors detect one or more of said selected discrete spectral components.

27. The apparatus of claim 26, wherein said logic circuitry is formed on said primary surface by substantially the same photolithographic processes as and substantially simultaneously with the formation of said one or more solid state photoreceptors and said diffraction grating.

28. The apparatus of claim 27, wherein said logic circuitry and said diffraction grating are formed at least in part from amorphous silicon.

29. An apparatus for resolving a polychromatic electromagnetic signal representing a scan line of a scanned document into a continuous spectrum and for sensing on at least a partially page-wide basis a selected set of discrete spectral components of said spectrum, comprising a generally transparent substrate having a first surface and a second surface, the second surface of the type capable of causing a polychromatic electromagnetic signal incident thereupon at an angle of incidence to enter the substrate such that each of the spectral components of the signal subtends a different angle from the angle of incidence to thereby separate the signal into its spectral components such that they pass through the substrate and strike the first surface at spatially separated locations, and sensing means formed on said first surface and positioned such that selected spectral components impinge thereupon for sensing on at least a partially page-wide basis.

30. The apparatus of claim 29, further comprising a diffraction grating formed on said second surface such that the subtending of different angles by the spectral components of the polychromatic electromagnetic signal is caused at least in part by said diffraction grating.

* * * * *